Oct. 7, 1958   H. S. CAMPBELL   2,854,931
FLEXIBLE CABLE CARGO NET CONSTRUCTION
Filed Jan. 14, 1952   3 Sheets-Sheet 1
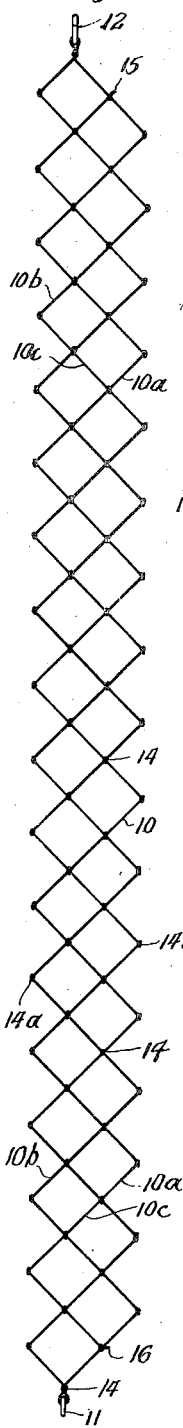
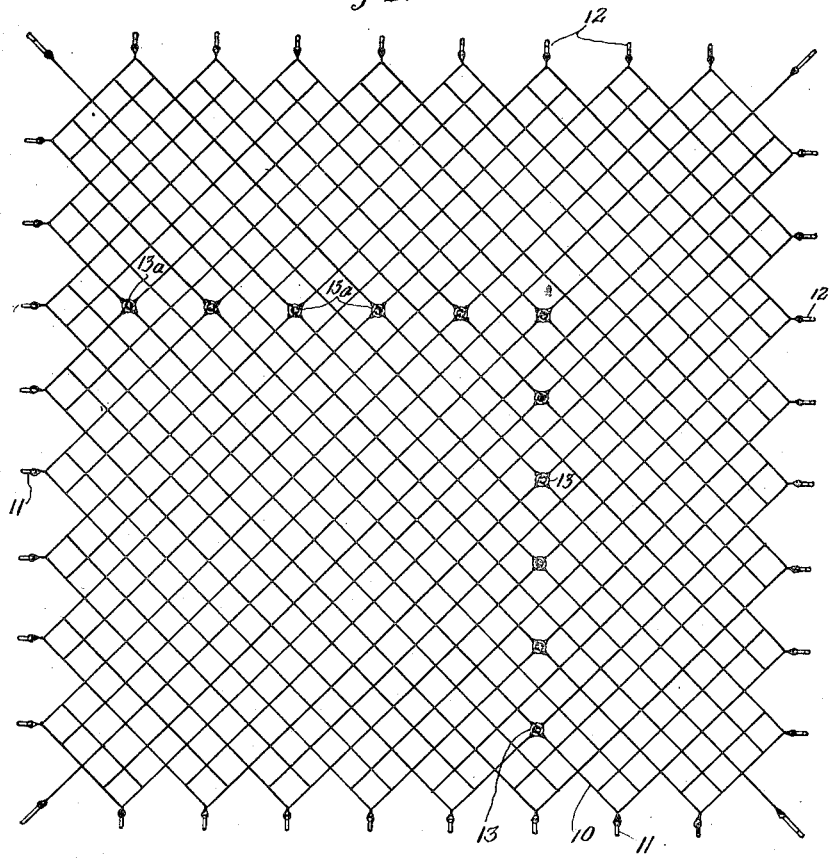
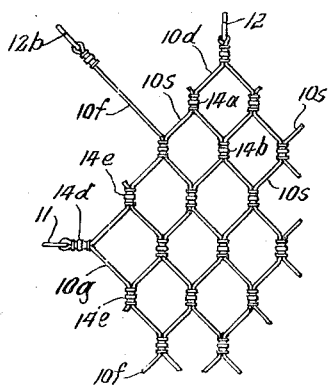
INVENTOR
Harris S Campbell INVENTOR
Harris S. Campbell Oct. 7, 1958  H. S. CAMPBELL  2,854,931
FLEXIBLE CABLE CARGO NET CONSTRUCTION
Filed Jan. 14, 1952  3 Sheets-Sheet 3
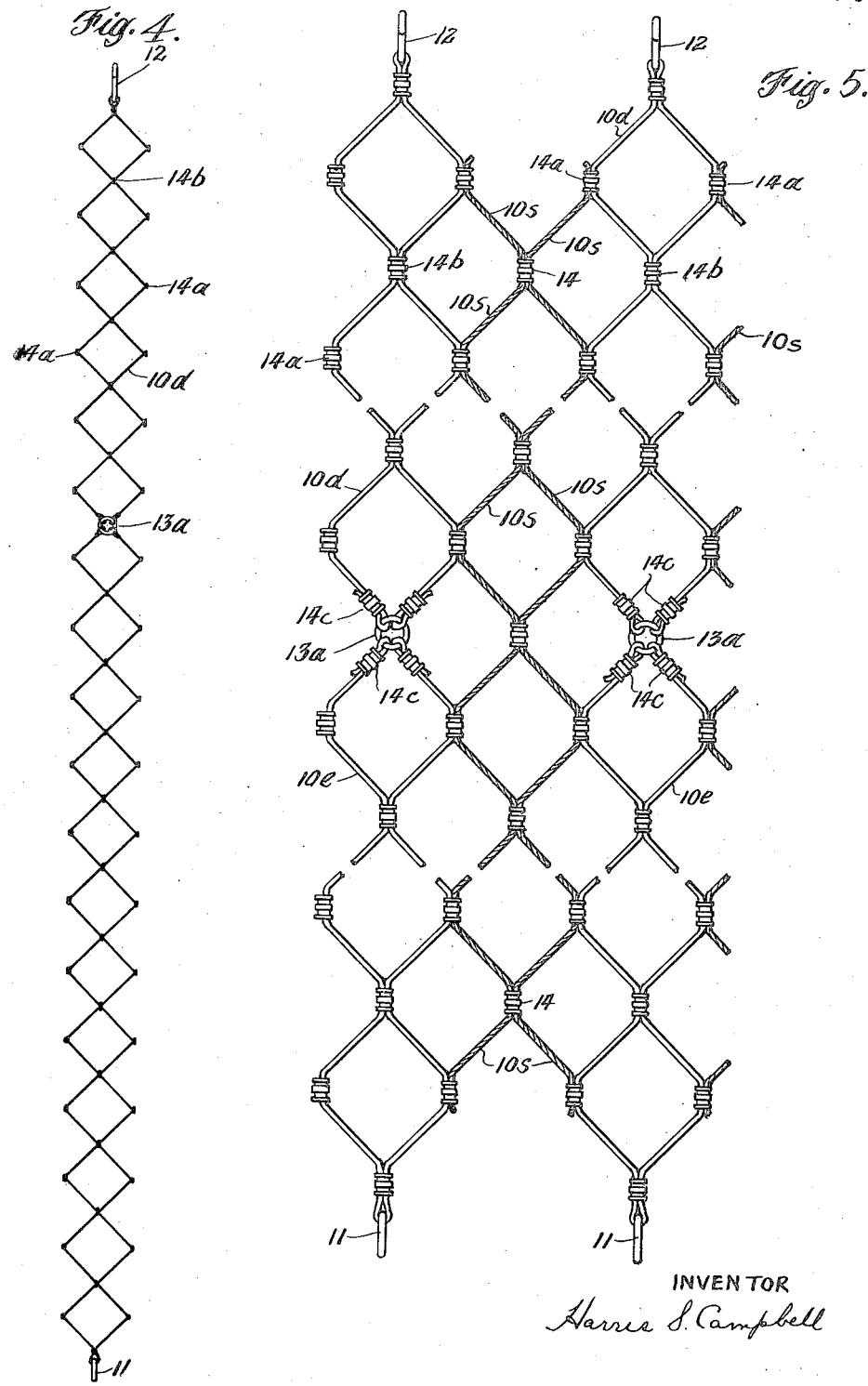
INVENTOR
Harris S. Campbell United States Patent Office 2,854,931
Patented Oct. 7, 1958

2,854,931

FLEXIBLE CABLE CARGO NET CONSTRUCTION

Harris S. Campbell, Bryn Athyn, Pa., assignor to Eastern Rotorcraft Corporation, Neshaminy, Pa., a corporation of Pennsylvania Application January 14, 1952, Serial No. 266,353

7 Claims. (Cl. 105—369)

This invention relates to nets constructed from flexible cable in a manner which provides that all the cable members lie in the same plane to eliminate crossing of cables.

In nets of this type the cables forming the mesh are arranged to run longitudinally in generally zig-zag fashion to form a diamond formation with one cable member connected to adjacent cables on either side at alternate points by swaged fittings. This construction permits ready folding of the net by bringing the individual cable members of the net into compact parallel relationship. The net may then be rolled into a relatively small coil for storage purposes. In extended position no cable member crosses another member. The general construction of a net of this nature is shown in my copending U. S. application, Serial No. 232,271 filed June 19, 1951, now Patent No. 2,705,461, issued April 5, 1955.

One of the primary objects of the present invention is to provide an improved construction for nets of this type by so relating the length and runs of cable in the net assembly that the number of swaged assembly fittings required for assembly is a minimum. By relating the point of start and point of finish of the various cable lengths to suit the assembly pattern in the part of the net in which the length is used, the need for extra fittings for splicing or fastening of the terminal fittings may be eliminated. Besides the advantage of eliminating the need for a number of swaging fittings or other cable splicing means, the present construction simplifies the net assembly and at the same time results in saving weight. When nets of this type are used for securing or handling cargo on aircraft, the problem of weight is particularly important. The construction further provides a neater appearance and eliminates spliced ends at the anchor points of the net which might catch in equipment and cause inconvenience in the handling of the nets during the operation of the securing or releasing cargo.

A further object of the invention is the provision of a net construction which permits manufacture of separate portions of the net ready for final assembly in a master assembly fixture. By allowing the manufacture of part of the net consisting of two, three, or more runs in sub-assembly fixtures, the time required for final assembly in the main fixture is greatly reduced with the result that a larger number of nets may be completed with a single final assembly fixture. In this way the cost of manufacture is materially reduced.

In nets of this type it is often desirable to keep the size of the mesh relatively small so that it will retain a collection of articles of small dimensions. The retention or load tranfer points are often spaced a distance greater than the distance between adjacent mesh corners, for example, the load transfer anchor fittings may be spaced twice the distance of the mesh corners. A specific object of the invention is to provide a net construction having attachment fittings with spacing greater than the mesh dimension which construction utilizes a sub-assembly composed of a single length of cable to provide for three runs of cable lengthwise of the net, each sub-assembly portion incorporating an anchor fitting at each end as an integral part of the assembly. This object includes the construction which permits the connecting of the two triple run sub-assemblies by a single run length of cable at final assembly.

A further object of the invention is the construction of a cable net in which an internal fitting such as a ring may be incorporated in the body of the net pattern. The present invention includes the fabrication of a sub-assembly using a single length of cable which constitutes two partial runs for the net between the internal fitting and the end terminal fitting. This object includes the joining together of two such sub-assemblies by two single runs of cable to maintain the proper double spacing of the terminal fittings in the net pattern.

These and other objects and advantages of the invention will be clearly understood from the following description of the drawings in which—

Figure 1 illustrates a net pattern including the features of the present invention.

Figure 2 illustrates a triple run sub-assembly of the net to a larger scale.

Figure 4 shows a sub-assembly of the net with a double run having a ring fitting inserted in the pattern.

Figure 5 shows a portion of the ends of two double runs to enlarged scale and illustrates the manner in which these are connected together by two single run cable members.

Figure 6 shows a portion of the side of the net to an enlarged scale and illustrates the manner in which the side anchor members are attached.

Figure 3:
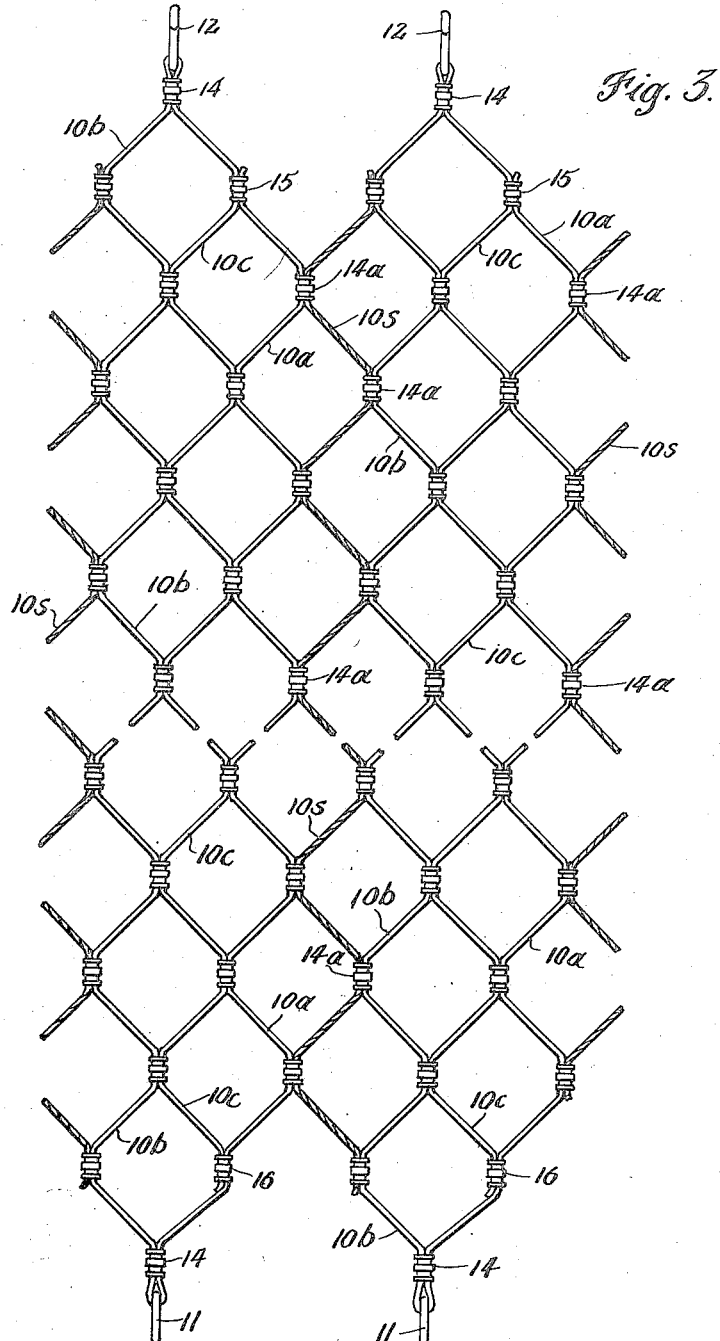
Figure 3 shows a portion of the net to a further enlarged scale to show the terminal construction and the method of connecting two triple run sections.

Referring to Figure 1 it will be seen that the general net pattern is arranged to provide for attachment fittings along each edge. As will be observed the net is composed of flexible wire cable 10 which is arranged to form the squares of the mesh. The ring terminals 11 extend along one side and one end of the net while the hook terminals 12 are located at alternate mesh points along the other side and end of the net. In order to provide inside lashing or connecting points, ring anchor fittings 13 are inserted in the net pattern at the positions illustrated, thereby allowing the use of a portion of the net where a small area only is needed.

In constructing a net of the present type the cables are arranged to run in zig-zag formation without crossing. As viewed in Figure 1 the cables therefore, run generally longitudinally in a vertical direction running from the bottom edge of the net to the upper edge of the net and back again. This construction allows the net to be readily drawn out to a series of parallel cables to provide for compact storage when not in use. In Figure 1 the net is shown in fully extended position.

At the right hand portion of Figure 1 the cables 10 run the full length of the net without interruption. However, in the left hand portion of the net every other pair of cables is interrupted by the ring fittings 13a. A different method for running the cables and making the assembly to produce the finished net is required with respect to the right hand portion as compared to the left hand portion of the net.

The construction used in the full length runs is more clearly illustrated in Figures 2 and 3. Figure 2 shows a complete sub-assembly of a portion of the right hand part of the net. The cable forming the sub-assembly shown in Figure 2 is made up of a single length of flexible cable 10. The swaged fittings, by means of which the cables are connected to form the mesh, are illustrated by numeral 14. In forming the sub-assembly the cable starts at point 15 and runs in zig-zag fashion down the outside line 10a of the sub-assembly to the point 16, thence runs around through the fitting 11, being placed through the swaging fitting 14 both before and after passing through ring fitting 11, thence along the left hand side 10b of the sub-assembly to hook fitting 12 and returns down the center as indicated at 10c connecting alternate points on runs 10a and 10b, run 10c terminating at point 16 next to the fitting 11.

The manner in which the cable is run and the relationship of the cables to the swaging fittings and the terminal fittings will be clearly seen by referring to Figure 3. The start of the cable run 10a at 15 is more clearly illustrated and the path of the cable 10a can be followed to the point 16. After leaving point 16 it will be observed that the cable passes through the end swaging fitting 14, then through ring 11, back through terminal swaging fitting 14 and returns as run 10b to the opposite terminal fitting 12. From the terminal 12 the cable again goes through the swaging fitting at the point 15 and continues as run 10c to end at the fitting at point 16 to complete the triple run sub-assembly.

In Figure 3 there are two such sub-assemblies lying side by side. Each of these sub-assemblies may be made up in the form shown in Figure 2 in a separate fixture which holds the swaging fittings in proper relative position during the operation of running the cable into position and performing the swaging operation to hold them rigidly connected at the mesh points. Only the internal swaging fittings 14, that is those through which two cables are run, are swaged in the sub-assembly operation. Thus the outer fittings 14a of the triple run unit are left loose on the cable for final assembly use. In Figure 3 two sub-assembly units composed of triple runs 10a, 10b, 10c are shown connected together by a single run length of cable 10s. By placing the sub-assembled triple runs in proper relationship in the final assembly fixture they may be readily connected together with the single run 10s and the remaining unswaged fittings 14a are then swaged to connect the two sub-assembly units in permanent assembled relationship. This combination of triple run lengths connected by single run lengths allows the formation of the mesh and the terminal fitting attachment by a regular pattern of swaging fittings without the need for using additional swaging fittings at other points for splicing purposes. This construction is especially suited for use with a net pattern where the terminal fittings are attached to every other pair of longitudinal runs of cable.

Figures 4 and 5 illustrate how the portion of the net containing the internal ring fittings 13a is constructed. In Figure 4 the complete sub-assembly for a single section incorporating a lower ring fitting 11 and upper hook fitting 12 and an internal ring fitting 13a is shown. This sub-assembly may be made up on a separate fixture, only the central swaged fittings 14b being swaged in the jig or fixture, the outside fittings 14a through which only one cable runs being left loose on the cables. Ring fitting 13a is inserted into the assembly, as will be more clearly seen from Figure 5, by wrapping an end of the cable run 10d or 10e through the ring fitting 13a and anchoring it with a swaged fitting 14c. Thus the sub-assembly as indicated in Figure 4 is composed of two lengths of cable, namely length 10d which runs from fitting 13a to terminal fitting 12 and back again to ring fitting 13a and length 10e which runs from ring 13a to the lower ring fitting 11 and back to ring 13a.

Figure 5 illustrates the manner in which two or more such sub-assemblies as shown in Figure 4 are connected. Two of the sub-assemblies are placed in proper relative position in the final assembly fixture and connected together by two single runs of cable 10s. These single runs are shown in shaded fashion in Figure 5. The two single runs 10s with their connecting fittings 14 thus complete the mesh pattern between the two sub-assemblies and provide for a proper edge spacing between the terminal fittings without changing the pattern or requiring any additional swaged fittings 14.

To complete the net assembly at each side, a special single run of cable as indicated by 10f in Figure 6, is used to connect the corner fittings shown at 12b. A single run length 10s is located just inside length 10f. Each of the fittings 11 or 12 along the sides of the net is attached by a short length of cable 10g, a swaged fitting 14d being used to locate the fitting 11 or 12 in position. This small sub-assembly is then connected to the regular swaged fittings 14e at alternate points along the side run 10f thereby completing the net structure.

In Figures 3, 5 and 6, the terminals of the cables are shown projecting out of the swaged fittings for the purpose of clearly disclosing where the length of cable ends. In actual practice the cable end is made flush with the swaged fitting to prevent snagging. Also in many types of nets it is desirable to use standard thimbles at the fitting points 11, 12 and 13 to protect the cables. The cable connecting fittings 14 are made from deformable metal and are securely fastened in proper position to the cable members by means of a squeezing tool operated either manually or by external power. The fittings shown in Figures 3 and 5 are somewhat exaggerated in size for illustration purposes.

From the foregoing description it will be evident that I have provided an improved net construction which gives a complete uninterrupted mesh pattern having a swaged fitting at every net mesh point. This construction is accomplished without the need for using extra cable connecting fittings beyond those required to form the mesh corners of the net. The use of triple run lengths of cable as one of the main sub-assembly units permits rapid fabrication and facilitates final assembly in a fashion to give greater production from a single final fixture. It will be obvious that, in nets which do not incorporate internal anchor fittings, the complete net can be formed from the triple run sub-assembly units connected together with single lengths and using the standard side fitting attachment. This construction also permits the use of internal fittings in any desired location by using a single length between the internal fittings and the terminal fittings and by connecting such sub-assemblies by single run lengths. By the use of this sub-assembly system nets having different patterns with respect to the internal fitting members may be fabricated as desired since the sub-assemblies may be connected together by single run lengths in any desired relationship (without the need for splicing connections of any sort) while still maintaining a simplicity of pattern. With this pattern arrangement an efficient net may be constructed with a saving in space, weight and cost.

I claim:

1. A cargo net construction including a series of flexible cable members, each member disposed in generally zig-zag relationship and lying in a single plane when in open position of the net, connecting fittings attaching adjacent cable runs at mesh points, a portion of the net comprising three full length runs of cable formed from a single unbroken length of cable, said portion including an anchor fitting fastened at each end thereof, a single length run connected to said portion at interconnecting mesh points by a connecting fitting, said single length run extending in zig-zag fashion to form complete four sided meshes.

2. A cargo net construction including a series of flexible cable members, each member disposed in generally zig-zag relationship and lying in a single plane when in open position in the net, connecting fittings attaching adjacent cable runs at mesh points, a portion of the net comprising three full length runs of cable formed from a single unbroken length of cable, said portion including an anchor fitting fastened at each end thereof, a second three run portion formed from a single unbroken length of cable, a single run length of cable joining the two three run portions, said single length run being disposed in zig-zag fashion and being connected first to one portion and then to the other portion at alternate mesh points by mesh connecting fittings to form complete four sided meshes.

3. A cargo net constructed with a plurality of runs of flexible cable lying in a generally longitudinal direction, each cable run being attached at spaced points to an adjacent run on one side and attached at alternately spaced points to an adjacent run on the other side thereof, swagged fittings for accomplishing the attachment between cables at the spaced points to form the net mesh pattern, a portion of the net being formed by a single length of cable which makes three longitudinal runs, said portion of the net having a single length run at one side thereof, two anchor fittings connected to said net portion, one of said fittings being attached to two of said three longitudinal runs at one end of the net portion and the other anchor fitting being attached to another two of said three longitudinal runs at the other end of the net portion.

4. A cargo net constructed with a plurality of runs of flexible cable lying in a generally longitudinal direction, each cable run being attached at spaced points to an adjacent run on one side and attached at alternately spaced points to an adjacent run on the other side thereof, swaged fittings for accomplishing the attachment between cables at the spaced points to form the net mesh pattern, a portion of the net being formed by a single length of cable which makes three longitudinal runs, two anchor fittings connected to said net portion, one of said fittings being attached to two of said three longitudinal runs at one end of the net portion and the other anchor fitting being attached to another two of said three longitudinal runs at the other end of the net portion, a single run length of cable connected to each of said portions at alternate mesh points by swaged fittings, thereby forming a larger net portion having a regular mesh pattern in which all cable lengths terminate at a mesh point and utilize the regular mesh point swaged fittings as their terminal anchorages.

5. A cable net assembly constructed with a plurality of runs of flexible cable lying in a generally longitudinal direction, each internal cable run being attached at spaced mesh points to an adjacent run on one side and attached at alternately spaced mesh points to an adjacent run on the other side thereof, cable connecting fittings forming the attachment means at the mesh points, a part of said net comprising a single length of cable extending into a plurality of runs, said part of the net having a single length run of cable disposed in zig-zag fashion and connected to it at one side at mesh points by cable connecting fittings to form complete four sided meshes.

6. A net construction in accordance with claim 5 in which the single length of cable which extends into a plurality of runs forms a part of two adjacent runs having an anchor fitting at the external end.

7. A net construction in accordance with claim 5 in which each of the two ends of said single length of cable terminates at an internal anchor fitting.

References Cited in the file of this patent

FOREIGN PATENTS 32,401     Netherlands _____ July 15, 1932